(12) United States Patent
Pierce et al.

(10) Patent No.: US 7,516,250 B2
(45) Date of Patent: Apr. 7, 2009

(54) APPARATUS AND METHOD FOR MANAGING COMPONENT IDENTIFIERS IN A DATA STORAGE SYSTEM

(75) Inventors: Timothy Keith Pierce, Tucson, AZ (US); Brian Gerard Goodman, Tucson, AZ (US); Justin James Hom, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/076,205

(22) Filed: Mar. 9, 2005

(65) Prior Publication Data

US 2006/0224881 A1 Oct. 5, 2006

(51) Int. Cl.
*G06F 3/00* (2006.01)
*G06F 9/44* (2006.01)

(52) U.S. Cl. .............................. 710/16; 710/8; 717/120
(58) Field of Classification Search ..................... 710/16
See application file for complete search history.

(56) References Cited

U.S. PATENT DOCUMENTS

| | | | |
|---|---|---|---|
| 5,289,372 A | 2/1994 | Guthrie et al. .............. | 364/403 |
| 5,819,100 A | 10/1998 | Pearce .................... | 395/750.05 |
| 6,154,790 A * | 11/2000 | Pruett et al. ................... | 710/15 |
| 6,625,732 B1 | 9/2003 | Weirauch et al. ............. | 713/200 |
| 6,697,073 B1 * | 2/2004 | Kadota ........................ | 345/501 |
| 6,725,205 B1 | 4/2004 | Weiler et al. ................... | 705/57 |
| 7,363,392 B2 * | 4/2008 | Thomas ......................... | 710/8 |
| 2004/0186690 A1 * | 9/2004 | Swanson et al. ............. | 702/187 |

* cited by examiner

*Primary Examiner*—Henry W. H. Tsai
*Assistant Examiner*—Michael Sun
(74) *Attorney, Agent, or Firm*—Kunzler & McKenzie

(57) ABSTRACT

An apparatus and method are disclosed for managing component identifiers in a data storage system. The apparatus includes a recognition module, a receiving module, a comparison module, and an update module. The recognition module recognizes newly installed components. The receiving module receives a component identifier stored on the newly installed component. The comparison module compares the identifier of the newly installed component with one or more component identifiers stored in a computer system memory. The update module updates the one or more component identifiers stored in the system memory based upon the identifier of the newly installed component.

17 Claims, 8 Drawing Sheets

APPARATUS AND METHOD FOR MANAGING COMPONENT IDENTIFIERS IN A DATA STORAGE SYSTEM

BACKGROUND OF THE INVENTION

1. Field of the Invention

This invention relates to a system and method of managing drive serial numbers in an automated data storage library, and more particularly to a system and method of electronically tracking, updating, and storing serial numbers for replacement parts in an automated storage library.

2. Description of the Related Art

Many computer systems have replaceable components that may need to be tracked for warranty purposes. For example, field replaceable devices such as tape drives in an automated media changer subsystem may be tracked for warranty purposes by their serial number or other component identifier. This can occur if the device is a separate device type within a larger subsystem, and not just a feature of the subsystem. When a device is replaced it may be desirable to retain the serial number of the original device. This allows the manufacturer of the system to maintain the original warranty based on the time remaining from the original system purchase, and not based on the time remaining from a newer replacement part.

One problem with conventional computer systems is that a device's serial number may be located in multiple places on or within the device. Typically, there maybe an external tag affixed to the replaceable device that contains the device serial number. This tag is often changed or updated by the service personnel when they replace the device. Some systems also have a service panel or console that allows a service technician to update the internal device memory with the desired serial number. Host computers can initiate certain commands, such as the SCSI "Inquiry" command, to access component serial numbers or identifiers. Thus, component information can be obtained by the manufacturer to determine warranty eligibility issues. The problem with this approach, however, is that there are often mismatches between the serial number on the external tag and the internal serial number stored in the device memory.

In conventional systems, the serial number mismatch problem is solved by relying on the service personnel to enter the correct serial number for the device. This may be accomplished by presenting a question on an operator panel whether to keep the existing serial number or input a new one. Or, the burden may solely rest with the service personnel to remember to update the device with the original serial number. This approach is problematic in both cases, however, because it requires intervention by the service personnel and there is always an exposure for mistake or neglect. The serial number may not be updated with the correct value.

The device's internal serial number or identifier that is reported through the host application software becomes very important when this device is serviced again at a future date. If the serial number has not been updated correctly it may appear that the warranty is still in effect when in fact it may have already expired. Alternatively, there may be no warranty information if the serial number has not been updated correctly. Multiply this exposure by thousands of devices in the field and it can have a very significant effect on warranty cost and the profitability of the company servicing the devices.

From the foregoing discussion, it should be apparent that a need exists for an apparatus, system, and method for managing component identifiers in a data storage system that reduces the exposure of failing to update a device with the correct serial number. It would be a further advancement in the art to provide such an apparatus and method that could automate the component management process by allowing the firmware of the parent subsystem in which the device resides to automatically make the correct decisions. It would be a further advancement in the art to provide such a system that could manage component identifiers and store appropriate identifiers to facilitate component warranty programs. Such an apparatus, system and method are disclosed and claimed herein.

SUMMARY OF THE INVENTION

The present invention has been developed in response to the present state of the art, and in particular, in response to the problems and needs in the art that have not yet been fully solved by currently available component manager systems. Accordingly, the present invention has been developed to provide an apparatus, system, and method for managing component identifiers within a data storage system that overcome many or all of the above-discussed shortcomings in the art.

An apparatus to manage computer system components is provided with a logic unit containing a plurality of modules configured to functionally execute the necessary steps of recognizing a newly installed component, receiving an identifier electronically stored in the newly installed component, comparing the identifier of the newly installed component with one or more component identifiers stored in a memory of the computer system in which the component resides, and automatically updating the one or more component identifiers stored in the system memory based upon the identifier of the newly installed component. These modules in the described embodiments include a recognition module, a receiving module, a comparison module, and an update module.

The apparatus may further be configured to update the identifier electronically stored on the newly installed component based upon one or more identifiers in the system memory. The comparison module may be configured to determine whether the newly installed component is a component that has not been previously installed in the computer system. It may also determine whether the newly installed component is a newly added component, a replacement component, or has previously been associated with the computer system, but in a different location. In one embodiment, the update module may store the identifier of the newly installed component or replace the identifier of the newly installed component with the identifier of a separate previously installed component associated with a separate component receptor.

A method of the present invention is also presented for managing component identifiers in a data storage system. The method of the disclosed embodiments substantially includes the steps necessary to carry out the functions presented above with respect to the operation of the described apparatus and system. In one embodiment, the method includes recognizing a newly installed component, receiving an identifier stored on the newly installed component, comparing the identifier of the newly installed component with one or more component identifiers stored in a computer system memory, and updating the one or more component identifiers stored in the system memory based upon the identifier of the newly installed component.

In a further embodiment, the method may include determining an association between a component identifier and a component receptor configured to receive the component associated with the component identifier. The method may also include determining whether the newly installed component is a component that has not been previously installed in the computer system. It may further include determining whether the identifier of the newly installed component is also associated with another component within the computer system.

In one embodiment, the method of the present invention may store the identifier of the newly installed component as the identifier of a separate previously installed component associated with a separate component receptor. The method may replace the identifier of the newly installed component with the identifier of a separate previously installed component.

A method of service is also disclosed. The method may include installing a computer system component, receiving an identifier stored on the newly installed component, comparing the identifier of the newly installed component with one or more component identifiers stored in a computer system memory, and updating the one or more component identifiers stored in the system memory based upon the identifier of the newly installed component.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
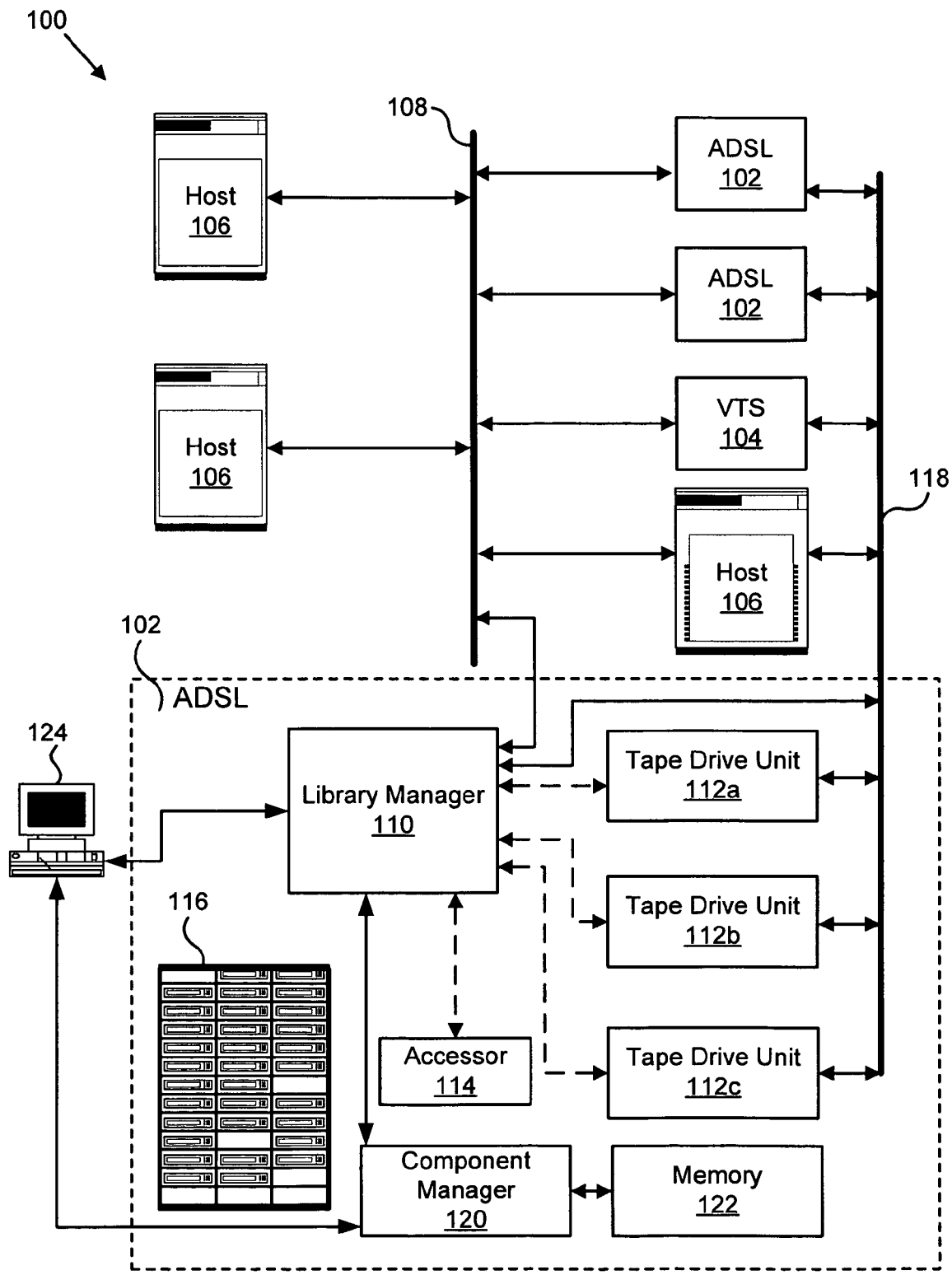
FIG. 1 is a schematic block diagram illustrating one embodiment of a system for managing component identifiers in a data storage system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and processors.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

FIG. 1 illustrates a schematic block diagram of one embodiment of a representative system 100 that may incorporate the apparatus or teachings of the present invention. The system 100 may include computer systems which may comprise, but are not limited to, data processing systems, Automated Data Storage Libraries (ADSL), Virtual Tape Servers (VTS), storage controllers, disk storage arrays, and the like. Those of skill in the art will appreciate that any computer system that includes replaceable components could practice this invention. In the illustrated embodiment, the system 100 is a data storage server 100 that may include an automated data storage library (ADSL) 102, virtual tape server (VTS) 104, and host 106. Each host 106 may be a mainframe computer. Alternatively, the host(s) 106 maybe servers or personal computers using a variety of operating systems. The host 106 and the VTS 104 are connected via a storage area network (SAN) 108 or another suitable communications channel, for example, an Enterprise System Connection (ESCON) channel used in IBM mainframe computers. In an alternative embodiment, the data storage system 100 may exclude the depicted VTS 104.

Each automated data storage library 102 may include one or more library controllers, such as library manager 110, one or more data drive devices, which may be tape drive units 112, an accessor 114, and a plurality of mountable media 116. In one embodiment, the mountable media includes tape cartridges, magnetic disks, optical disks, electronic memory, CDs, DVDs, or other media that can store data and be mounted to a drive unit, and the like. The library manager 110, which includes at least one computing processor, is interconnected with, and may control the actions of, the tape drive units 112 and/or the accessor 114.

The interconnections between the library manager 110, the tape drive units 112, and the accessor 114 are shown as dashed lines to indicate that the library manager 110 may only transmit and receive control signals, rather than data to be stored or retrieved, to the tape drive units 112 and/or the accessor 114. Data for storage or retrieval may instead be transmitted directly between the VTS 104 and the tape drive units 112, or between the host 106 and the tape drive units 112 via a network 118, which may be a storage area network, (SAN), local area network (LAN), wide area network (WAN), or another suitable type of network, including the Internet or a direct connection between the VTS 104 and the tape drive units 112 via a point to point or multi-drop bus connection, for example, a Small Computer Storage Interface (SCSI), Fibre Channel interface, ESCON interface, etc. Data and/or control signals for tape drives 112 can be transmitted and received through connections between the VTS 104 and the library manager 110 or directly from library manager 110 to tape drives 112 via network 118.

Figure 5:
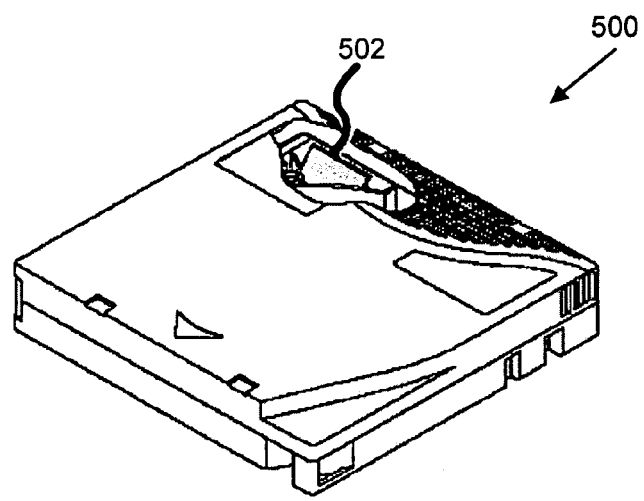
FIG. 5 is an isometric view of an exemplary data storage cartridge.

The accessor 114 may be a robotic arm or another mechanical device configured to transport a selected mountable media 116 between a storage bin and a tape drive unit 112. The accessor 114 typically includes a gripper and a bar code scanner, or a similar reading system, mounted on the gripper. The bar code scanner is used to read a volume serial number (VOLSER) printed on a cartridge label affixed to the cartridge 500 (FIG. 5). In alternative embodiments, the tape drive units 112 may be replaced by optical disk drives or magnetic disk drives, electronic media drives, or other removable media drives. Similarly, the mountable media 116 may include magnetic media, optical media, electronic media, or any other removable media corresponding to the type of drive employed.

A control console 124 is connected to the library manager 110. The control console 124 may be a computer in communication with the library manager 110 so that a user can control the operating parameters of the tape library unit 102 independently of the host 106. Alternatively, the control console 124 may comprise an operator panel, keyboard and display, web user interface, or any other user interface. The control console 124 may also be used to access drive data stored in a memory 122, such as serial numbers or other identifiers, drive location information, operability data such as length of use or status information, and the like. The system 102 may also contain a component manager 120, which is accessible in one embodiment by the control console 124. The component manager 120 may be operably connected to the memory 122 for storing and retrieving component data. Alternatively, the component manager 120 may be part of the library controller (e.g., library manager 110).

Figure 2:
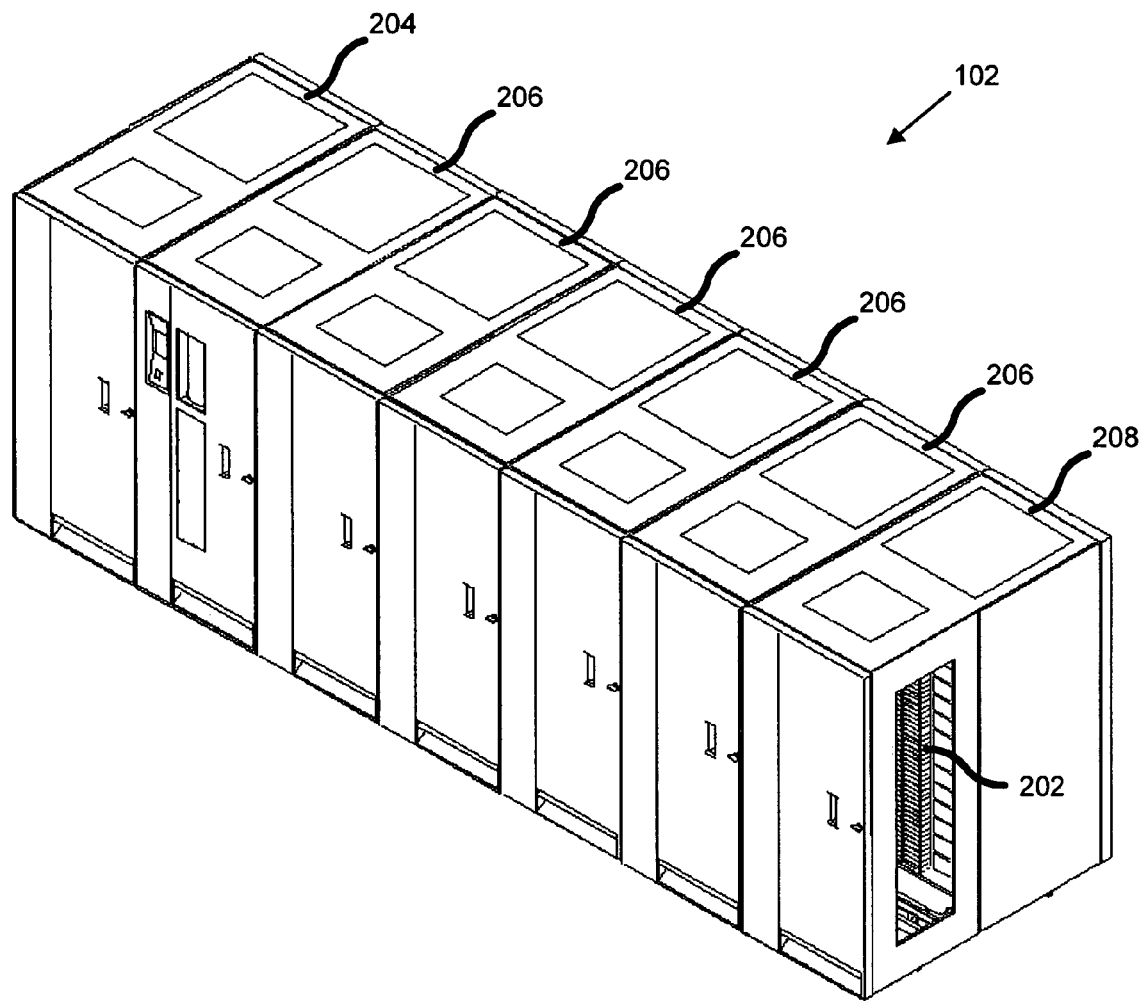
FIG. 2 is an isometric view of an automated data storage library adaptable to implement an embodiment of the present invention.

Turning now to FIG. 2, an automated data storage library 102 suitable to practice the teachings of the invention is illustrated. The automated data storage library 102 stores and retrieves data storage cartridges containing data storage media (refer to FIG. 5) in storage shelves 202. Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, Magneto Resistive MAAM, etc.), mechanical media (such as MEMS, microelectromechanical systems, based storage), or other suitable media. Typically, the data stored in automated data storage libraries is resident on data storage media that is contained within a cartridge and referred to as a data storage media cartridge.

It is noted that references to "data storage media" herein also refer to data storage cartridges and, for purposes herein, the two terms are used synonymously. An example of an automated data storage library 102 which may implement the present invention, and has a configuration as depicted in FIG. 2, is the IBM 3584 UltraScalable Tape Library.

The library 102 of FIG. 2 comprises a left hand service bay 204, one or more storage frames 206, and a right hand service bay 208. A service bay 204, 208 is characterized by its designation as the location in which an accessor may "park" when being serviced, or not in use. Having a service bay 204, 208 at each end of the library 102 allows multiple accessors to each have full access to all of the storage shelves 202 and drives within the intermediate storage frames 206. For example, one accessor may park out of the way in the left service bay 204 while a second accessor accesses a drive in the storage frame 206 adjacent to the left service bay 204. All of the service bays 204, 208 and storage frames 206 may be referred to as frames 204-208. As will be discussed, a frame 204-208 may comprise an expansion component of the library 102. Frames 204-208 may be added or removed to expand or reduce the size and/or functionality of the library 102. Frames 204-208 may comprise additional storage shelves 202, drives, import/export stations, accessors, operator panels, etc, as will be discussed below.

Figure 3:
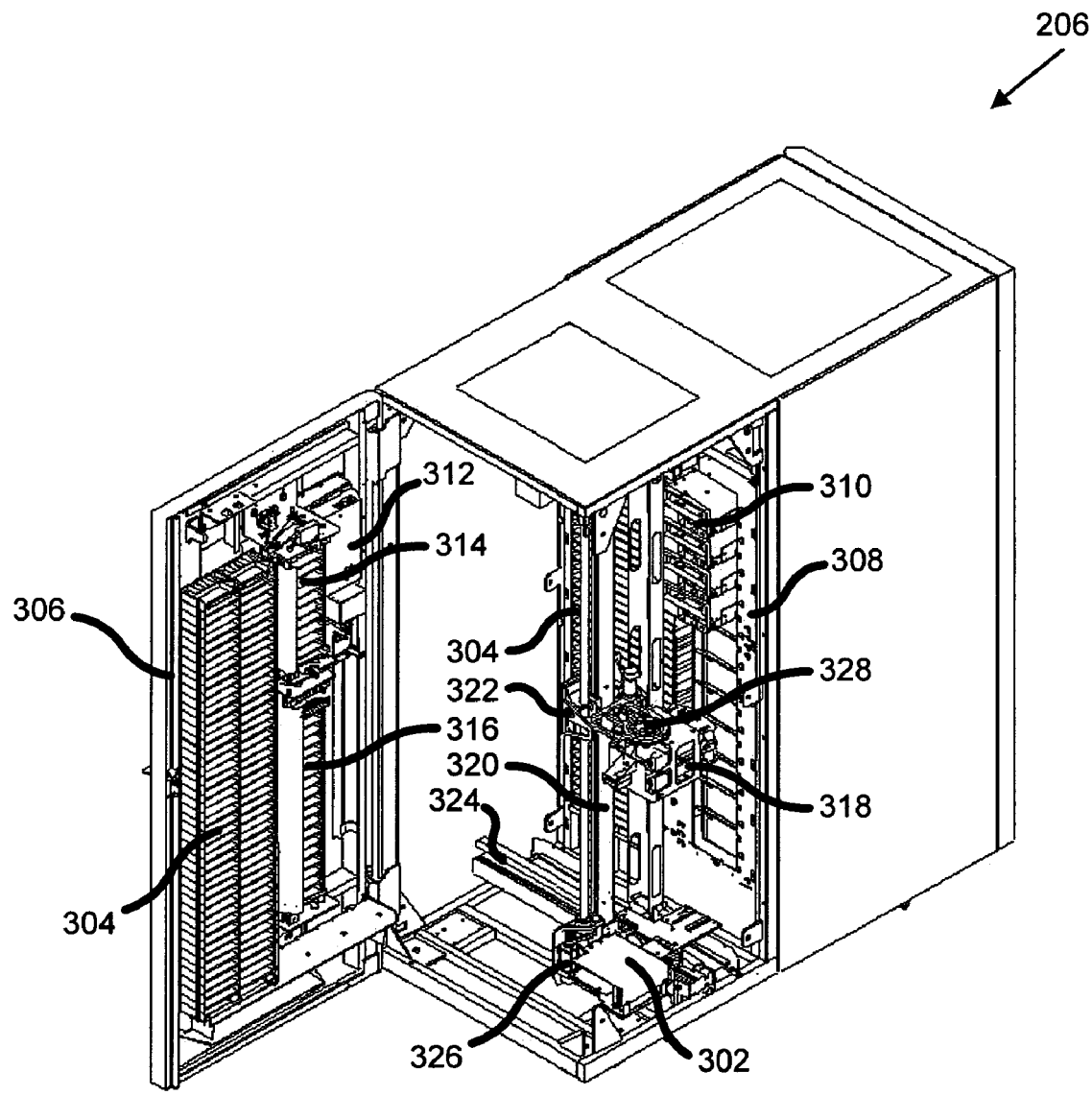
FIG. 3 is an isometric view of a storage frame, including an exemplary basic configuration of some internal components, of the automated data storage library of FIG. 2.

FIG. 3 illustrates an example of a single storage frame 206, which is in one embodiment, the minimum configuration of an automated data storage library 102. In this minimum configuration, there is only a single accessor 302 (i.e., there are no redundant accessors) and there are no service bays 204, 208. The library 102 is arranged for accessing data storage media in response to commands from at least one external host system (not shown). In one embodiment, the library 102 comprises a plurality of storage shelves 304 on front wall 306 and rear wall 308; at least one data storage drive 310 for reading and/or writing data with respect to the data storage media; and the illustrated accessor 302 for transporting the data storage media between the plurality of storage shelves 304 and the data storage drive(s) 310. The storage shelves 304 and the storage drives 310, as well as other locations suitable for holding data storage media, may be referred to as "data storage locations." The data storage drives 310 may be optical disk drives, magnetic tape drives, or other types of data storage drives as are used to read and/or write data with respect to the data storage media.

The storage frame 206 may optionally comprise an operator panel 312 or other user interface, such as a web-based interface, which allows a user to interact with the library 102. The storage frame 206 may optionally comprise an upper I/O station 314 and/or a lower I/O station 316, which allows data storage media to be inserted into the library and/or removed from the library without disrupting library operation. For example, a user may insert a storage media cartridge into one of the I/O stations 314, 316 while the front wall 306 of the storage frame 206 is closed. The I/O stations 314,316 also may be referred to as "data storage locations." Further embodiments of the library 102 also may comprise one or more service bays 204, 208 and/or additional storage frames 206.

As described above, each of the storage frames 206 may be configured with different components depending upon the intended function. One configuration of storage frame 206 may comprise storage shelves 304, data storage drive(s) 310, and other optional components to store and retrieve data from the data storage cartridges. In a further embodiment, the storage frame 206 may be converted to a service bay 204, 208 within a larger automated data storage library 102. Conversely, a service bay 204, 208 may be converted into a storage frame 206, such as when additional frames 204-208 are added onto an existing library 102. The new frames 206 may be attached to the existing service bay 204, 208. The existing service bay 204, 208 then may be converted into a storage frame 206 and filled with storage shelves 304, drives 310, and the like. Alternatively, a service bay 204, 208 may already contain storage shelves 304 and there may be no conversion required (refer to the storage shelves 202 in FIG. 2).

In one embodiment, the accessor 302 comprises a gripper assembly 318 for gripping one or more data storage media and transporting the data storage media among the storage shelves 304 and drives 310. The gripper assembly 318 is mounted to a vertical rail 320 (also referred to as a "Y" rail) and may be transported vertically on the vertical rail 320 via a Y rail drive 322. The vertical rail 320 and gripper assembly 318, in turn, may be transported horizontally along a horizontal rail 324 (also referred to as an "X" rail) by an X rail drive 326. If multiple accessors 302 are installed in a single library 102, they may each run on an independent X rail(s) 324 or may run on the same X rail(s) 324. In a further embodiment, the gripper assembly 318 may rotate approximately 180 degrees via a rotational drive 328. In this way, the gripper assembly 318 may access the storage shelves 304 and I/O stations 314,316 on the front wall 306, as well as the storage shelves 304 and drives 310 on the rear wall 308.

Figure 4:
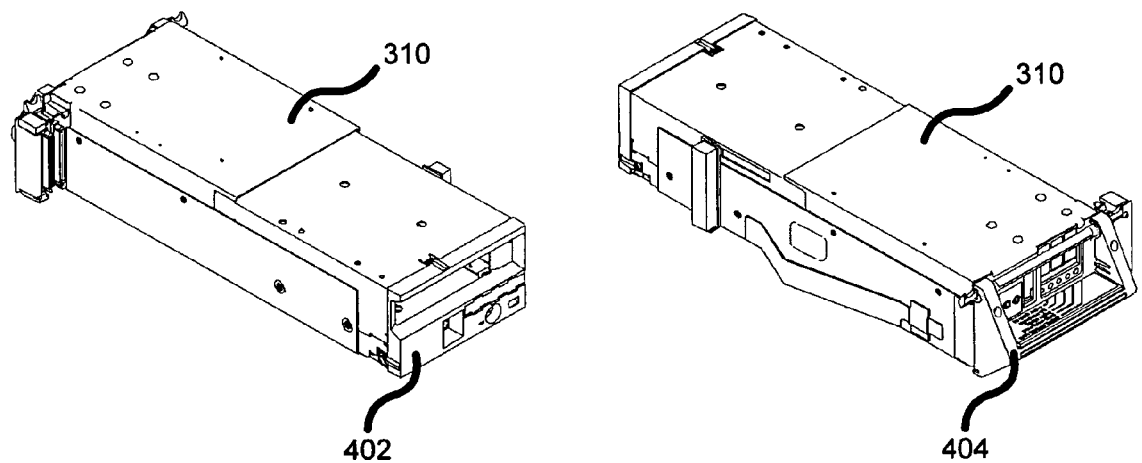
FIG. 4 is an isometric view of the front and rear of a data storage drive that may be used in the automated data storage library of FIG. 2.

FIG. 4 illustrates one embodiment of a data storage drive 310 that may be installed in the automated data storage library 102 of FIGS. 1, 2 and 3. Specifically, FIG. 4 depicts the front 402 and rear 404 of a data storage drive 310. In the example shown in FIG. 4, the data storage drive 310 comprises a hot-swap drive canister. This is only an example and is not meant to limit the invention to hot-swap drive canisters. In fact, any configuration of data storage drive 310 may be used whether or not it comprises a hot-swap canister. The drive 310 also includes memory (not shown) on which a drive serial number may be stored.

FIG. 5 illustrates one embodiment of a data storage cartridge 500 that may be used in conjunction with the data storage drive 310 shown in FIG. 4. The illustrated data storage cartridge 500 includes a cartridge memory 502 (shown in a cutaway portion of the figure). This is only an example and is not meant to limit the invention to cartridge memories 502. In fact, any configuration of data storage cartridge 500 maybe used whether or not it comprises a cartridge memory 502. Additionally, as mentioned above, references to "data storage media" herein also refer to data storage cartridges 500 and, for purposes herein, the two terms are used synonymously, usually referring to the physical cartridge 500 handled by the gripper assembly 318.

Figure 6:
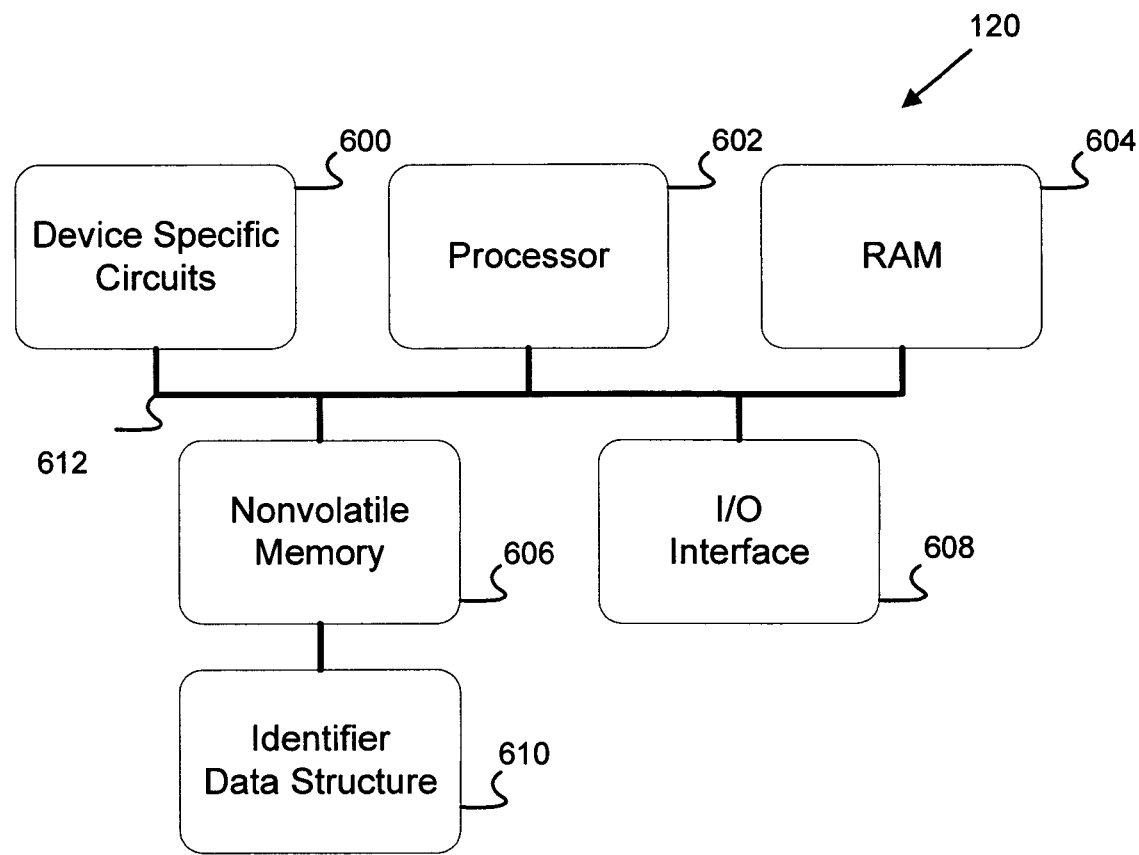
FIG. 6 is a schematic block diagram illustrating an alternative embodiment of the system of managing component identifiers in a data storage system.

FIG. 6 illustrates a component manager apparatus 120 according to the present invention. The component manager apparatus may comprise a library controller, such as library manager 110. In addition, the component manager may reside on one or more nodes of a distributed control system such as U.S. Pat. No. 6,356,803. The component manager 120 includes one or more processors 602, random access memory (RAM) 604, nonvolatile memory 606, device specific circuits 600, and I/O interface 608. Alternatively, the RAM 604 and/or nonvolatile memory 600 may be contained in the processor 602, as could the device specific circuits 600 and I/O interface 608. The processor 602 may comprise, for example, an off-the-shelf microprocessor, custom processor, field programmable gate array (FPGA), application-specific integrated circuit (ASIC), discrete logic, or the like. The RAM 604 is typically used to hold variable data, stack data, executable instructions, and the like. The nonvolatile memory 606 may comprise any type of nonvolatile memory such as, but not limited to, electrically erasable programmable read only memory (EEPROM), flash programmable read only memory (PROM), battery backup RAM, and hard disk drives. The nonvolatile memory 606 is typically used to hold the executable firmware and any nonvolatile data.

The firmware may include the component manager method for performing component management such as recognizing a newly installed component, receiving an identifier stored on the newly installed component, comparing the identifier of the newly installed component with one or more component identifiers stored in a computer system memory, and updating the one or more component identifiers stored in the system memory based upon the identifier of the newly installed component. It will be appreciated by those of skill in the art that system memory may include any memory within the system that can store identifier information, including but not limited to, RAM, PROM, EPROM, Flash PROM, and the like. The nonvolatile memory 606 may also include data structures 610 to store component identifiers such as drive serial numbers. The data structures 610 may also store component information such as component location, length of use, current status, warranty information, and the like.

The I/O interface 608 comprises a communication interface that allows the processor 602 to communicate with devices external to the component manager. Examples may comprise, but are not limited to, serial interfaces such as RS-232, USB (Universal Serial Bus) or SCSI (Small Computer Systems Interface). The device specific circuits 600 provide additional hardware to enable the component manager 120 to perform unique functions. The device specific circuits 600 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 600 may reside outside the component manager 120. A bus 612 operably connects the devices of the component manager to each other. The bus 612 may include but is not limited to a microprocessor bus, register bus, electrical connections, etc.

Figure 7:
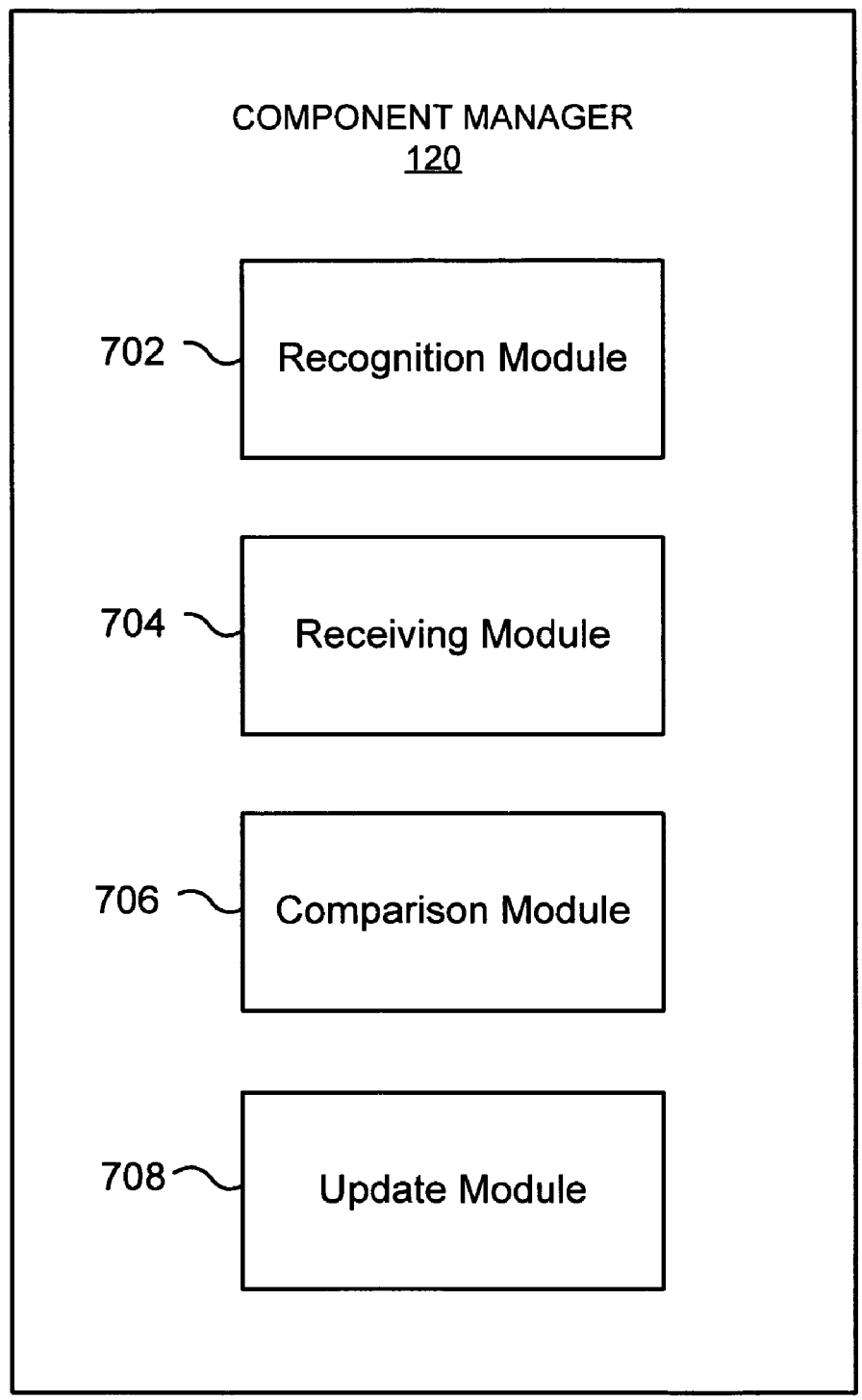
FIG. 7 is a schematic block diagram illustrating an apparatus for managing components according to the present invention.

FIG. 7 illustrates a component manager 120 apparatus according to one embodiment of the present invention. The component manager 120 includes a recognition module 702 configured to recognize a newly installed component. The term newly installed component includes all components recently recognized in the component receptor in which the component is installed. A newly installed component may include old components swapped in for a failing drive (e.g., swapped between component receptors). It may also include newly manufactured components that have never been installed in the particular system. Newly installed components may also include replacement components and components that have recently come on-line or recently been powered up. Thus, newly installed should not be limited to the time in which a component has been connected to a component receptor. Newly installed components also include, but are not limited to, components newly recognized as being associated with a particular receptor in the system in which they reside.

The recognition module 702 may recognize newly installed components in any number of ways, including but not limited to, touch from a robotic device, a mechanical sensor, an optical sensor, a proximity sensor, a magnetic sensor, an electrical connection. In one embodiment, a communication "handshake" between the component and the system comprising the component (e.g., through a component receptor) is used. The recognition module may also include executables to execute system protocols each time new or different hardware components are installed. In one embodiment, when a component is installed into the computer system, the recognition module 702 executes a communication "handshake" in which the computer system configures the component with parameters stored in the computer system's nonvolatile memory.

The component manager 120 may also include a receiving module 704 configured to receive a component identifier stored on the newly installed component. As discussed above, replaceable components of the kind used in this invention may include an identifier stored in a component memory. The identifier may also be stored in the devices, hardware, firmware, and/or software. In one embodiment, the component is a data drive and the identifier is a serial number. The receiving module 704 retrieves the identifier of the component recognized by the recognition module 702. In one embodiment, during the communication "handshake", the receiving module 704 will read parameters from the component, including the component identifier. The component identifier is stored in the component's nonvolatile memory and contains the serial number of the component.

The component manager 120 also includes a comparison module 706 configured to compare the identifier of the newly installed component with one or more component identifiers stored in a computer system memory. Accordingly, the comparison module 706 can determine whether a component is new to the system. It can also determine whether the new component to the system is a field replacement unit (FRU) or manufactured unit that has not been used in the system before.

The comparison module 706 can also determine an association between a component identifier and a component receptor configured to receive the component. Further, the comparison module 706 determines whether the identifier of the newly installed component is associated with any another component and/or component receptor within the computer system. For example, the newly installed component may have resided elsewhere in the system and its identifier may already be stored in system memory. It may be advantageous to switch components within the system. This may occur when the operability of a particular component or component receptor needs to be checked and it is not clear whether the problem lies with the component or the component receptor.

Thus, in one embodiment utilizing data drives in an automated data storage library system, the comparison module 706 of the apparatus 120 of the present invention will use the drive's serial number to compare with other drive serial numbers stored in the library system's nonvolatile memory to determine if the drive is new, such as a field replacement, or newly added, or if the drive has already resided in the subsystem in any receptor. When the library firmware determines the drive is not recognized as one that has been in the library subsystem before it will check to see if the service personnel has identified this drive as being a field replacement unit (FRU) as will be discussed.

The component manager 120 also includes an update module 708 configured to update the one or more component identifiers stored in the system memory based upon the identifier of the newly installed component. The component identifier updating may include storing the identifier of a replaced or previously installed component as the identifier of the newly installed component. The update module 708 may also update the identifier stored on the installed component based upon one or more identifiers in the system memory, as will be discussed.

The update module 708 can also store the identifier of a separate installed component as the identifier of the newly installed component. Where it is determined that the newly installed component has not resided in the system, or had its identifier stored in the system memory, the update module 708 stores the identifier of the newly installed component.

Returning again to the example where the replaceable component is a data drive within an automated data storage library, if the comparison module 706 determines that the drive is a FRU drive then the update module 708 will store or maintain the original serial number from the drive that was removed. The process to maintain the original drive serial number will be to retrieve the original serial number from the library subsystem's nonvolatile memory and write the serial number to the new drive. The new drive will now report the original serial number from the replaced drive, maintaining the original warranty period based on the original drive purchase.

Accordingly, a component's identifier is reported to the system to determine if a component is a new component such as a field replacement unit or newly added, or whether it is a component that has already existed in the system, possibly in another position within the system. The update module 708 can then take action based on the results. If the comparison module 706 determines that a newly installed component's identifier is not found in the system's records and it has been identified as a FRU by service personnel, the original (or replaced) component's identifier will be maintained and written back to the newly installed component and stored in that component's nonvolatile memory. This will allow the newly installed component to report the correct, original, identifier and provide for proper warranty tracking based on the original component's purchase date.

If the comparison module 706 determines the component's identifier has existed in any position within the computer system, the update module 708 will exchange the identifier currently associated with the current component position with the position that this component last occupied. It will be appreciated by those of skill in the art that in this way, swapping components within the system will allow their identifiers to follow them in the system records. Thus, installing new or replacement components will force a decision to be made by the component manager 120, whether the component's new identifier should be used or if the identifier from the replaced or previously installed component should be kept.

One advantage of having the computer system keep track of component identifiers and be responsible for correctly assigning identifiers to components is that this tracking and association will now be automated. This removes the possibility for mistakes or neglect by the service personnel. This improved identification of a component based on its identifier, and the determination whether it is within the warranty period, has the potential to save the company servicing the components significant money because the warranty period will be tied to the original component.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
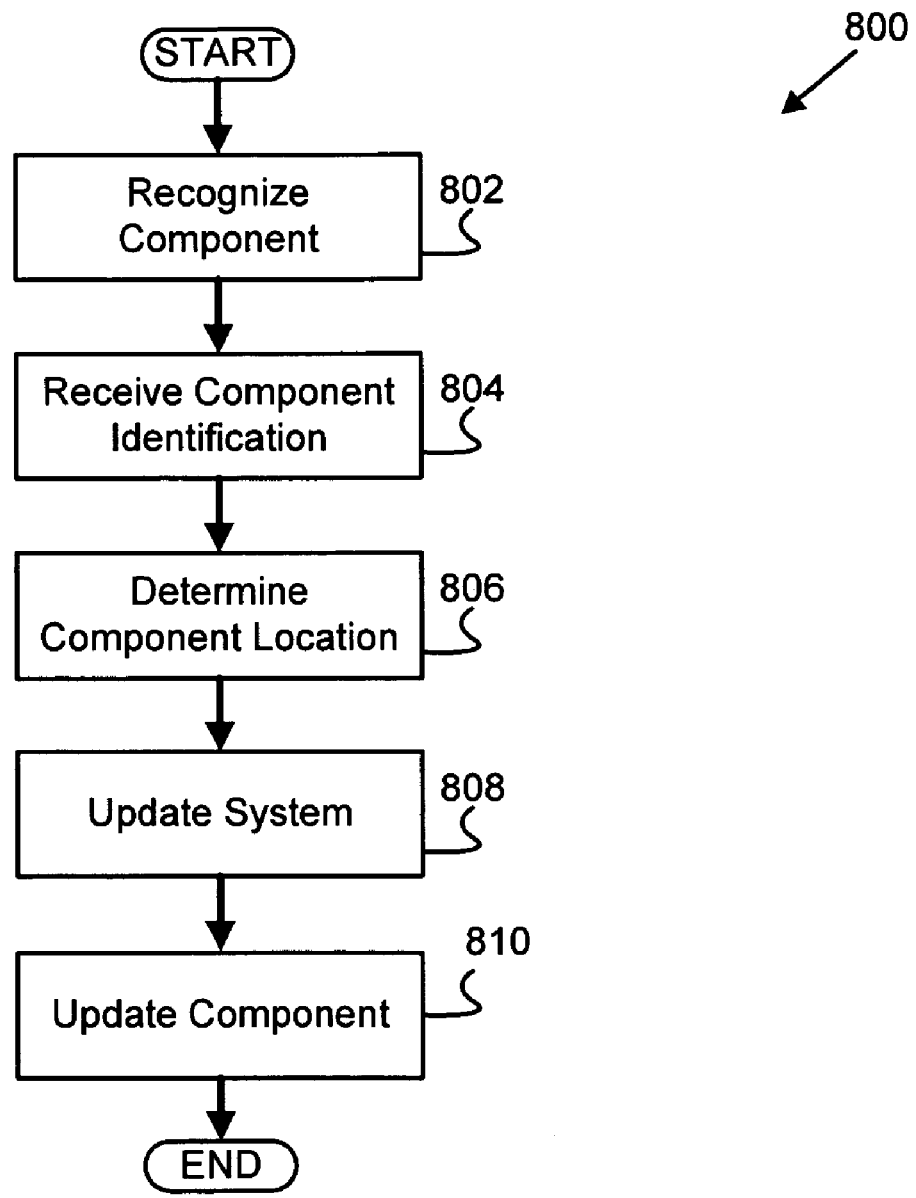
FIG. 8 is a schematic flow chart diagram illustrating one embodiment of a method for managing component identifiers in a data storage system that may be implemented on the system of FIG. 1.

FIG. 8 illustrates a method 800 of managing component identifiers according to the present invention. In one embodiment, the method could be employed by a signal bearing medium tangibly embodying a program of machine-readable instructions executable by a digital processing apparatus to perform an operation to manage components in a computer system. The instructions and/or method includes recognizing 802 a newly installed component. It also includes receiving a component identifier 804 stored on the newly installed component. The instructions and/or method also compares 806 the identifier of the newly installed component with one or more component identifiers stored in a computer system memory and determines component location. It then optionally updates 808 the component identifiers stored in the system memory based upon the identifier of the newly installed component. In one embodiment, the instructions and/or method optionally updates 810 the component itself.

The instructions and/or method may also determine an association between a component identifier and a component receptor configured to receive the component associated with the component identifier. The comparing step 806 may also determine whether the newly installed component is a replacement component, a swapped component, or whether it is a component that has not been previously installed in the computer system. The comparing step 806 may further determine whether the identifier of the newly installed component is associated with another component or component receptor within the computer system.

The updating step 808 may include storing the identifier of the newly installed component as the identifier of a separate previously installed component associated with a separate component receptor. Step 808 may also include storing the identifier of a separate installed component as the identifier of the newly installed component. In one embodiment, the update step 808 simply stores the identifier of the newly installed component.

Figure 9:
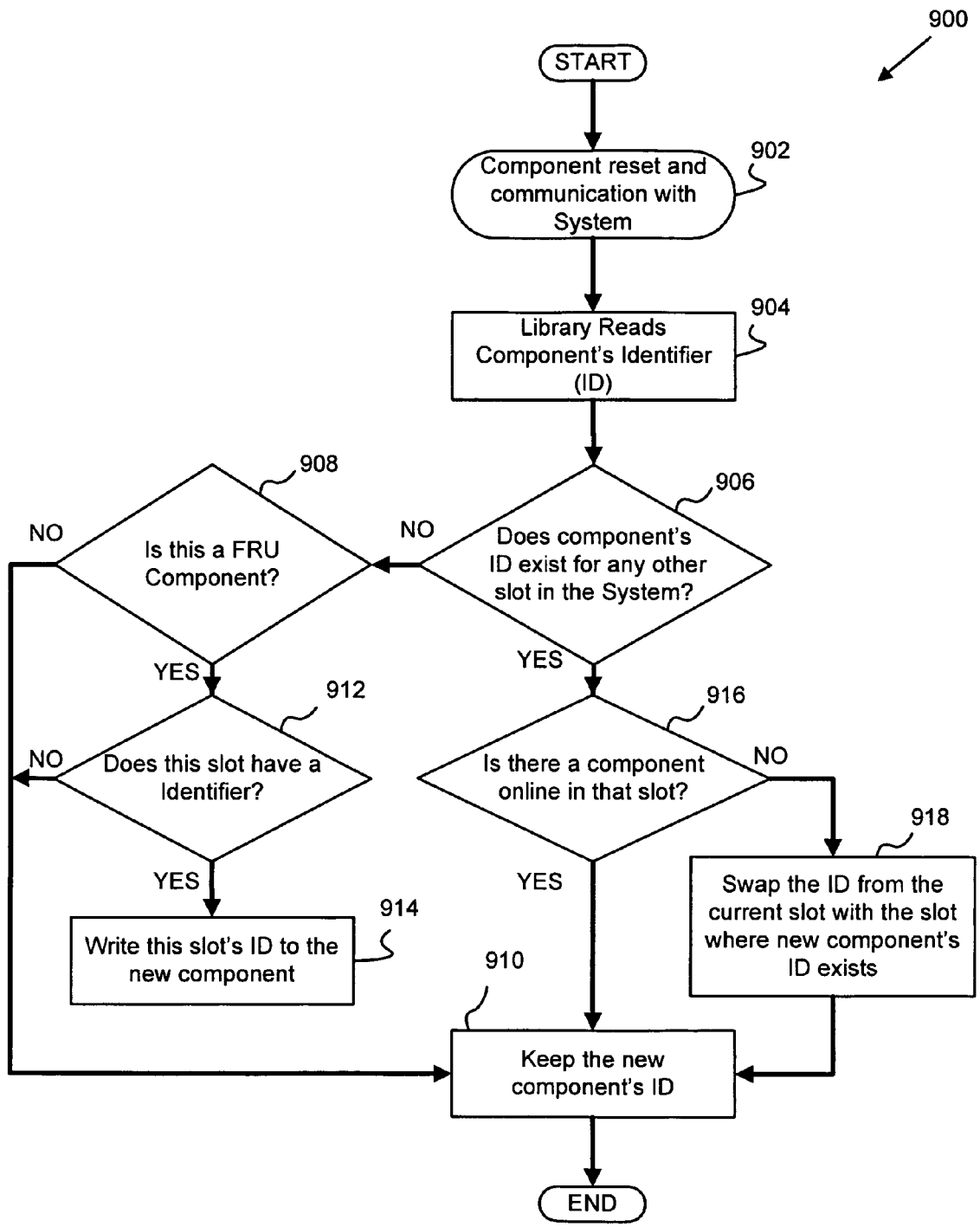
FIG. 9 is a more detailed schematic flow chart diagram illustrating one embodiment of a method for managing component identifiers in a data storage system in accordance with the present invention.

Referring now to FIG. 9, a more detailed embodiment 900 of the method 800 of FIG. 8 is presented. When the system powers up, or when a new component is plugged, or when some type of reset occurs, a communication 902 occurs. The component manager then reads 904 the identifier of that component. Each identifier for every replaceable component within the system may be kept in non-volatile storage within the system. In one embodiment, the component identifier is kept as a string of ASCII characters.

The component manager searches through the rest of the component receptors that are capable of receiving components, or in the case of an automated data storage library, the drive slots in the library, to determine 906 if the particular identifier of the newly installed component exists, or has existed, anywhere else in the system. Alternatively, the component manager search may comprise going through a list in memory. It will be appreciated that this step in one embodiment, checks to see if the components have been swapped within the system as opposed to installing a brand new drive or a replacement drive.

If it is determined that the component identifier does not exist for any other component receptor in the system, the component manager determines 908 whether the component is a field replaceable unit. In one embodiment, this determination 908 is made automatically. In another embodiment, this determination 908 is made through operator intervention by means of the console 124. If the component is not a field replaceable unit, the identifier of the newly installed component is saved 910 on the system. If it is a field replaceable unit, the component manager determines 912 whether the component receptor or drive slot already has another serial number associated with it. If it does, the already existing identifier or serial number is saved 914 on the new component. If there is no existing identifier associated with the component receptor or slot where the FRU is being installed, the identifier of the FRU is saved 910 in the system.

If the component manager determines 906 that the newly installed component has an identifier that is already associated with a component receptor in the system, or that the newly installed component identifier is already stored in the system, the component manager determines 916 whether the component receptor associated with the newly installed identifier has a component installed and on-line to the host system in the component receptor. If a component is present and on-line, the update module keeps 910 the identifier of the newly installed component and associates it with the component receptor of the newly installed component. It will be appreciated that in this configuration, even though the component manager recognizes a newly installed component and sees that component's identifier associated someplace else in the system, the component manager will not steal the existing component's identifier. If there is no drive or component installed and on-line, the identifier of the newly installed component is kept 910, but associated 918 with the component receptor where the identifier of the newly installed component was found elsewhere in the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, with executable code stored in a computer storage medium, to manage components in a computer system, the apparatus comprising:
   a recognition module comprising executable code stored on the computer storage medium, executable by a processor, and configured to recognize a newly installed component, wherein the newly installed component is a data storage drive of an automated data storage library;
   a receiving module comprising executable code stored on the computer storage medium, executable by the processor, and configured to receive a component identifier stored on the newly installed component and determine a component receptor for the newly installed component in the automated data storage library, wherein the component receptor is a drive slot;
   a comparison module comprising executable code stored on the computer storage medium, executable by the processor, and configured to compare the identifier of the newly installed component with one or more component identifiers stored in a computer system memory, each component identifier comprising a serial number that identifies a physical component, and determine whether the newly installed component is a field replacement component for a previously installed component; and
   an update module comprising executable code stored on the computer storage medium, executable by the processor, and configured to update the one or more component identifiers stored in the system memory if the newly installed component is a field replacement component, said update comprising storing the component identifier of the previously installed component as the component identifier of the newly installed component and storing an original component identifier of the newly installed component associated with the component identifier of the previously installed component.

2. The apparatus of claim 1, wherein the update module is further configured to update the component identifier stored on the newly installed component based upon one or more identifiers in the system memory.

3. The apparatus of claim 1, wherein the comparison module is further configured to determine an association between the component identifier and the component receptor configured to receive the component associated with the component identifier.

4. The apparatus of claim 1, wherein the comparison module is further configured to determine whether the newly installed component is a component that has not been previously installed in the computer system.

5. The apparatus of claim 1, wherein the newly installed component is installed in a component receptor and wherein the comparison module is further configured to determine whether the component identifier of the newly installed component is associated with a different component receptor within the computer system.

6. The apparatus of claim 1, wherein the update module is further configured to replace the component identifier stored in system memory at the location associated with the newly installed component with the component identifier of a separate previously installed component.

7. The apparatus of claim 1, wherein the update module is further configured to store the component identifier of a separate installed component as the component identifier stored in system memory at the location associated with the newly installed component.

8. The apparatus of claim 1, wherein the update module is further configured to store the component identifier of the newly installed component in the system memory.

9. A program of executable code stored on a computer storage medium and executable by a processor to perform an operation to manage components in a computer system, the operation comprising:
   recognizing a newly installed component, wherein the newly installed component is a data storage drive of an automated data storage library;
   receiving a component identifier stored on the newly installed component;
   determining a component receptor for the newly installed component in the automated data storage library, wherein the component receptor is a drive slot;
   comparing the component identifier of the newly installed component with one or more component identifiers stored in a computer system memory, each component identifier comprising a serial number that identifies a physical component;
   determining whether the newly installed component is a field replacement component for a previously installed component;
   updating the one or more component identifiers stored in the system memory if the component identifier of the newly installed component is a field replacement component, said updating comprising storing the component identifier of the previously installed component as the component identifier of the newly installed component and storing an original component identifier of the newly installed component associated with the component identifier of the previously installed component.

10. The program of claim 9, further comprising an operation to update the component identifier stored on the newly installed component based upon one or more component identifiers in the system memory.

11. The program of claim 9, further comprising an operation to determine an association between the component identifier and the component receptor configured to receive the component associated with the component identifier.

12. The program of claim 9, further comprising an operation to determine whether the newly installed component is a component that has not been previously installed in a computer system.

13. The program of claim 9, further comprising an operation to determine whether the component identifier of the newly installed component is also associated with another component within the computer system.

14. The program of claim 9, further comprising an operation to store the component identifier of the newly installed component as the component identifier of a separate previously installed component associated with a separate component receptor.

15. The program of claim 9, further comprising an operation to store the component identifier of a separate installed component as the component identifier of the newly installed component.

16. The program of claim 9, further comprising an operation to store the component identifier of the newly installed component.

17. A method of servicing a computer system having replaceable components, the method comprising:

installing a computer system component;

receiving a component identifier stored on the newly installed component;

determining a component receptor for the newly installed component in an automated data storage library, wherein the component receptor is a drive slot and the newly installed component is a data storage drive of the automated data storage library;

comparing the component identifier of the newly installed component with one or more component identifiers stored in a computer system memory, each component identifier comprising a serial number that identifies a physical component;

determining whether the newly installed component is a field replacement component for a previously installed component; and updating the one or more component identifiers stored in the system memory if the identifier of the newly installed component is a field replacement component, said updating comprising storing the component identifier of the previously installed component as the component identifier of the newly installed component and storing an original component identifier of the newly installed component associated with the component identifier of the previously installed component.

\* \* \* \* \*